(12) United States Patent  
LaBounty (10) Patent No.: US 11,297,795 B2
(45) Date of Patent: Apr. 12, 2022

(54) CAT WASTE MANAGEMENT SYSTEM (71) Applicant: Larry Richard LaBounty, Carlton, OR (US)

(72) Inventor: Larry Richard LaBounty, Carlton, OR (US)

(*) Notice: Subject to any disclaimer, the term of this patent is extended or adjusted under 35 U.S.C. 154(b) by 63 days.

(21) Appl. No.: 16/736,696

(22) Filed: Jan. 7, 2020

(65) Prior Publication Data
US 2020/0214253 A1 Jul. 9, 2020

Related U.S. Application Data (60) Provisional application No. 62/789,687, filed on Jan. 8, 2019.

(51) Int. Cl.
*A01K 1/01* (2006.01)
(52) U.S. Cl.
CPC .................... *A01K 1/0121* (2013.01)
(58) Field of Classification Search
CPC ............... A01K 1/0107; A01K 1/0121
See application file for complete search history.

(56) References Cited

U.S. PATENT DOCUMENTS

| 4,325,325 | A |   | 4/1982  | Larter |
|-----------|---|---|---------|--------|
| 4,602,593 | A |   | 7/1986  | Gross |
| 4,627,383 | A | * | 12/1986 | Metzger ............... A01K 1/0107 119/161 |
| 4,696,257 | A |   | 9/1987  | Neary |
| 5,193,488 | A |   | 3/1993  | Walton |
| 5,303,675 | A | * | 4/1994  | Van Den Bergh ... A01K 1/0107 119/165 |
| 5,511,513 | A | * | 4/1996  | Baron .................. A01K 1/0107 119/163 |
| 5,564,366 | A | * | 10/1996 | Hancock .............. A01K 1/0107 119/165 |
| 5,699,754 | A | * | 12/1997 | Cahajla ................ A01K 1/0107 119/165 |

(Continued)

FOREIGN PATENT DOCUMENTS

CA       1198638 A  * 12/1985  .......... A01K 1/0107
CN     109463287 A  *  3/2019

*Primary Examiner* — Magdalena Topolski
(74) *Attorney, Agent, or Firm* — Runyan Law; Charles Runyan (57) ABSTRACT

A cat waste management system including a litter-free waste management unit including a urine isolation container, a urine drainage receiver positioned on an inside bottom portion of the urine isolation container in static, gravitational positioning, a urine separation container, a urine collection tray having a drainage port and a separator ring in position, surrounding the drainage port, a urine drainage system, and a filter medium tray containing a filter-medium which is supported by the urine drainage receiver. All components of the litter-free waste management unit are stackable vertically. The urine drainage receiver provides perimeter support of the filter medium tray positioned above the urine drainage receiver. The litter-free waste management unit utilizes gravity to direct liquid excreta through the litter-free waste management unit. The filter medium is configured to allow liquid excreta to pass therethrough while permitting solid excreta from passing therethrough.

20 Claims, 5 Drawing Sheets (56) References Cited

U.S. PATENT DOCUMENTS

| | | | | |
|---|---|---|---|---|
| 5,749,317 | A * | 5/1998 | Richey | A01K 1/0107 119/165 |
| 5,803,016 | A * | 9/1998 | Poulson | A01K 1/0107 119/161 |
| 5,996,533 | A * | 12/1999 | Gordon | A01K 1/0114 119/166 |
| 6,523,495 | B1 * | 2/2003 | Rydman | A01K 1/0107 119/167 |
| 6,615,765 | B1 * | 9/2003 | Thomas | A01K 1/0107 119/161 |
| 8,863,693 | B2 * | 10/2014 | Kennington | A01K 1/0114 119/161 |
| 2006/0037548 | A1 * | 2/2006 | Mohr | A01K 1/0107 119/166 |
| 2007/0068461 | A1 * | 3/2007 | Hill | A01K 1/0114 119/166 |
| 2008/0178817 | A1 * | 7/2008 | Brewer | A01K 1/011 119/163 |
| 2010/0050951 | A1 * | 3/2010 | Maguire | A01K 1/0114 119/165 |
| 2012/0204800 | A1 | 8/2012 | Beaudoin et al. | |
| 2013/0298840 | A1 * | 11/2013 | Mishan | A01K 1/0107 119/165 |
| 2014/0299068 | A1 * | 10/2014 | Kupka | A01K 1/035 119/501 |
| 2019/0191662 | A1 * | 6/2019 | Takada | A01K 1/011 |
| 2020/0236897 | A1 * | 7/2020 | Hori | A01K 1/0107 |
| 2020/0323166 | A1 * | 10/2020 | Du | A01K 1/0064 |
| 2021/0051916 | A1 * | 2/2021 | Weber | A01K 1/0107 |

* cited by examiner

CAT WASTE MANAGEMENT SYSTEM

CROSS REFERENCE TO RELATED APPLICATION

The present application is related to and claims priority to U.S. Provisional Patent Application No. 62/789,687 filed Jan. 8, 2019, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of pet waste containers and more specifically relates to a filtered feline container.

2. Description of Related Art

Pet litter boxes have long been used for collecting waste from household pets, such as cats and other domesticated animals that are kept indoors. Existing litter boxes have a number of associated environmental hazards and inconveniences, such as the chemicals and the required maintenance. In addition, the required use of litter is costly for pet owners. A suitable solution is desired.

U.S. Pat. No. 5,193,488 to Robert W. Walton relates to a cat waste elimination system. The described cat waste elimination system includes a total system to remove, store and dispose of feline (or other animal) bladder and bowel movements through the introduction of and a complete utilization of many features and sub-systems to provide ways of operating and managing a fully sanitary method of wet and dry feline bladder and bowel excretions. The system encompasses a unique urine "purification by exposure to air process," via aeration. It uses the aerification process by having the urine go through a sand or other porous material in a top tray and then through a previous bottom of said top tray, thence dropping on a suspended porous aeration tablet or pad. This produces an aerified urine. The process is preferably aided by special chemicals implanted in the aeration table which is multi-layered. This then dries the urine, producing no odor, and provides a complete, disposable, sanitary, odorless system of urine deposits. The bowel movements lodge into the dry porous material for burial by the feline and/or disposal by the cat's owner, thus reducing to negligible any stool odor as there is no element to sustain a wet buried stool, as the sand or other porous material is dry.

BRIEF SUMMARY OF THE INVENTION

In view of the foregoing disadvantages inherent in the known pet waste containers art, the present disclosure provides a novel cat waste management system. The general purpose of the present disclosure, which will be described subsequently in greater detail, is to provide a feline excrement containment system that uses no litter material.

A cat waste management system is disclosed herein. The cat waste management system includes a litter-free waste management unit including a urine isolation container, a urine drainage receiver positioned on an inside bottom portion of the urine isolation container in static, gravitational positioning, a urine separation container, a urine collection tray having a drainage port and a separator ring in position, surrounding the drainage port, a urine drainage system, and a filter medium tray containing a filter-medium which is supported by the urine drainage receiver. All components of the litter-free waste management unit are stackable vertically including the urine isolation container, the urine separation container, the urine drainage receiver, the urine collection tray, the filter medium tray, and the filter medium. The urine drainage receiver provides perimeter support of the filter medium tray positioned above the urine drainage receiver. The litter-free waste management unit utilizes gravity and a precise structure and design to direct liquid excreta through the litter-free waste management unit. The filter medium is configured to allow liquid excreta to pass therethrough while permitting solid excreta from passing therethrough.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a cat waste management system, constructed and operative according to the teachings of the present disclosure.

DETAILED DESCRIPTION

As discussed above, embodiments of the present disclosure relate to a pet waste container and more particularly to a cat waste management system as used to improve the management of feline excrements.

Generally, the present invention provides feline excrement containment that uses no litter material. The device offers pet owners a waste management option that contains no chemicals or charcoal filter. It eliminates the need for air fresheners, electricity, or batteries. The device requires a one-time purchase with no additional supplies needed. The present invention reduces the amount of time and energy spent maintaining a cat's box. Cat waste management system is a container designed to be used as a cat waste management system that eliminates the use of litter and other unnecessary supplies, such as charcoal filters.

The invention is comprised of stackable portions including a litter-free waste management unit including a urine isolation container, a urine drainage receiver positioned on an inside bottom portion of said urine isolation container in static, gravitational positioning, a urine separation container, a urine collection tray having a drainage port and a separator ring in position, surrounding the drainage port, a urine drainage system, and a filter medium tray containing a filter-medium which is supported by the urine drainage receiver. The filter medium may facilitate the pass-through of urine while holding the feces. The lower container may be attached to the upper container and can pass liquid through the top of the lower container from the upper container. The device relieves surface tension by way of six hemispherical, concave depressions that surround the bottom perimeter of the upper container that maintain gravitationally static positioning. There is also a collection of small, asymmetrical, naturally water-smoothed stones with no chemicals or dyes. A relatively small and insignificant quantity of larger stones can be used. The exact specifications may vary.

Regarding the urine isolation container (UIC) the dimensions in a preferred embodiment are 23½" L×16⅞" W×5⅞" H. The urine isolation container may comprise polypropylene. Urine drainage valves are provided and may be opened when the cat box is placed on a toilet bowl rim. The disks are convex, push buttons, the circular bottom edges of which are slightly recessed in both valve housings when not in use. The height of the (2) drain push buttons, when closed, is sufficiently less than the height of the (six) perimeter feet, to minimize accidental triggering. When the push buttons become fully engaged on a toilet bowl rim, the push buttons will be flush with the tops of their housings. This configuration minimizes bowl-rim teetering. An optional, urine drain valve may be featured, depending on the drainage system type. This valve is opened manually and, in conjunction with optional toilet drain valves, functions as a safety device to prevent accidental, urine release.

As further disclosed below a convex, semi-cylindrical, gutter system is provided. The channels of which are 1"-1⅛" wide and concave from an inside view. The gutter system is inter-connected with itself and both urine drain valves mentioned above. The gutter system height is the same height as the (2) outside, drainage valve housings, but less than the height of the (six) perimeter feet. The valve housings are the two, black rings surrounding the white disks, which are the drainage valve push buttons. The gutter system also serves as a network of baffles. Container perimeter feet are provided which are approximately ¾" tall.

Regarding the Urine Isolation Container (UIC), push-button, valve-spring housings (×2) and valve shafts (×2) are provided. The UIC features semi-cylindrical drainage pathways, which, when viewed from the inside, are concave. Viewed from underneath the UIC, they are convex. A connecting conduit, in the center of the lengthwise gutter, joins both valve housings. The urine inlet (2) ports are located 180° opposite the connecting conduit, facing outward, toward the ends of the UIC, on the opposing sides of the conduit, also in the center, lengthwise gutter. The push-button valves, are connected directly by a single conduit, which is recessed at the bottom of the center gutter that courses the UIC lengthwise. This allows the Urine Collection Receiver (UCR) to lie directly over the conduit. In certain embodiments, a conical valve system is provided for urine drainage into a toilet. A gutter system may or may not be included depending on the variation of the cat waste management system.

There is a weight support "shoulder", located about halfway at all side walls. This shoulder on the UIC needs to be raised. This is to allow the Urine Separator Container (USC) above it, to drop down shoulder-to-shoulder, form an air lock. The fit of the two containers needs to be some-what loose.

Regarding the Urine Drainage Receiver (UDR), the UDR is centered on the inside bottom of the Urine Isolation Container (UIC), in static, gravitational positioning. Overflow holes may be included. The Urine Drainage Receiver provides perimeter support of the Filter Medium Tray (FMT), located above and contacting directly on it, while allowing 1.0 degree-1.5 degree slope of the Urine Collection Tray, UCT.

The measurement of the base of UDR is 11" L×6¼" W. Top measurement of upward and outward flaring sides is 14½" L×9½" W. The flaring provides more ergonomic handling, while allowing more volume and room for (2) spring housings, one at each end of the lengthwise dimension of the Urine Isolation Container (UIC). The height of UDR is 1⅜" outside and 1¼" inside. The perimeter of the base has ⅛" tall ribbing. The upper rim of the receiver flattens on the top perimeter edge, with hemispherical ribbing on the bottom thereunder, to provide non-slip handling, if it is ever necessary to lift it out, when the UDR is emptied alone or the entire urine containment is filled. The receiver will become buoyant, when containment approaches full capacity and the FMT is lifted away. The UDR serves as the primary baffle device in the UIC.

Now referring to the Urine Separation Container (USC), the dimensions are approximately 23½" L×16⅞" W×4¾" H. The dimensions are the same as the Urine Isolation Container (UIC), except height.) The containers comprise polypropylene. The Urine Collection Tray (UCT) comprise 1/16"-⅛" high spacers along the perimeter which raise the Urine Separation Container, so that the drainage radii of the Urine Collection Tray (UCT) do not contact the bottom perimeter of the UCT. The UCT is concave with a 1 degree-1.5 degree downward slope.

The UCT has (2) sets of laterally undulating radii, one set of which is two (2) inches distant from the center, drainage hole, and the other, four (4) inches distant. Both sets contain seventy-one (71) radii, which are spaced 2.5 degrees apart. (142 radii×2.5 degree=360 degrees). The sets of radii are of alternate length, in order to avoid convergence of radial undulations, as they approach the drainage hole. The radii are raised 1/16"-1/8" high and no wider than 1/8". The radii do not have any sharp or angled surfaces, but smooth and undulating.

The Separator Ring, as previously described, comprises polyvinylchloride (PVC). The separator Ring is positioned surrounding the drainage hole. The dimensions in a preferred embodiment are 2 3/8" diameter and a 3/32" thickness. Both flat (on the horizontal plane, top and bottom) surfaces have a row of (32) semicircular slots of 5/32" diameter. The upper and lower rows of the slots are offset, in order to provide more uniform, material strength. The Separator Spacer Ring (SSR) could be injection molded with the Filter Medium Tray (FMT), but not injection molded with the Urine Collection Tray (UCT).

Regarding the Filter Medium Tray (FMT), the FMT is configured with thousands of interconnected, 3/16" diameter, solid cones. There is one (1) cone for every 3/16" squared area and four (4) per each 3/8" squared area. The FMT may comprise polycarbonate or acrylic, which has to be replaced with injection-molded polypropylene in a single-unit formation of the Urine Separation Container (USC). The cones displace all horizontal surfacing, preventing the filter medium of lying flat and relieving surface tension of the urine to the filter medium, especially at the bottom surfaces of the Urine Isolation Container (UIC). When a solid object lies flat on a liquid, the tendency of the liquid is to adhere to the underside of the object, resulting in cohesiveness or surface tension. Not allowing the filter medium to lie horizontally flat, also permits the drainage holes to remain primarily open.

The FMT thickness may be equivalent to 5/32" and the cone height is 1/16". Centered within each set of four (4) cones, equivalent to an area 3/8" squared, there is one 0.100" (1/10") hole. The FMT, in one embodiment has 5,942 holes, and a similar amount of cones. Each 3/8" square section of the FMT has (4) cones, one (1) at each corner of the square section, with a 0.100-inch hole centered therebetween. This configuration provides 5,942 tiny funnels in this particular FMT.

The Urine Separation Container (USC), top perimeter, has a guard for marginal confinement of the filter medium. The Urine Isolation Container (UIC) comprises a clear material such that the urine levels in both the Urine Collection Receiver (UCR) and the Urine Isolation Container (UIC) can be monitored.

There are two (2) sets of radii. Each set contains seventy-one (71) radii. All of the radii are spaced 2.5 degrees apart. One set of radii begins two (2) inches from the center, drainage port. Another set of radii, offset between the other set of radii, begins four (4) inches from the center, drainage port. All radii undulate laterally while sloping 1 degree to 1.5 degrees downward. There is no downward undulation. The radii undulate laterally. The base width of all radii must be of a consistent width of no greater than 1/8 inch. If the eighth-inch dimension is exceeded, the base of all radii would reach convergence or overlap. The radii are no wider than 1/8 inch at their bases. (Exceeding a base width of 1/8 inch, the undulations will converge, as the two sets of radii approach the center, drainage hole. Convergence will cause damming, as the liquid races toward the hole. The valleys between the two (2) sets of radii must remain separated, so that they do not overlap, as they approach the hole.) The height range of the radii can be between 1/16-1/8 inch. Exceeding one-eighth of an inch in width would cause convergence, which would produce undesirable, sinuous overlapping. Exceeding a total of 142 radii (2 sets×71 radii each) is unnecessary. Fewer radii will work. One hundred forty-two (142) radii approach the quantity of maximized function. The undulations allow gravity to maintain greater acceleration, after urine falls through the Filter Medium Tray (FMT). When the urine travels through the rounded stones, the acceleration of gravity is slowed by friction, not distance. So, after the urine drips through the FMT, the liquid picks up acceleration, under static, gravitational positioning.

The filter medium of the present invention consists of an assortment of naturally occurring, asymmetrical stones, which have been smoothed by water action. The sieve sizing ranges larger than 1/8" and upwards of approximately 1/4", with a minimal mixture of slightly larger stones. Creek rock or river rock is generally rounded, semi-polished stones, potentially of a wide range of types, that are dredged or scooped from stream beds. The filter medium for the cat waste management system is preferably a mixture of upper-scale, granular gravel and lower-scale, pebble gravel.

A feces scoop is provided with the cat waste management system. The feces scoop is specially configured to allow larger stones to pass through a center-portion while feces are retained for disposal.

Figure 1:
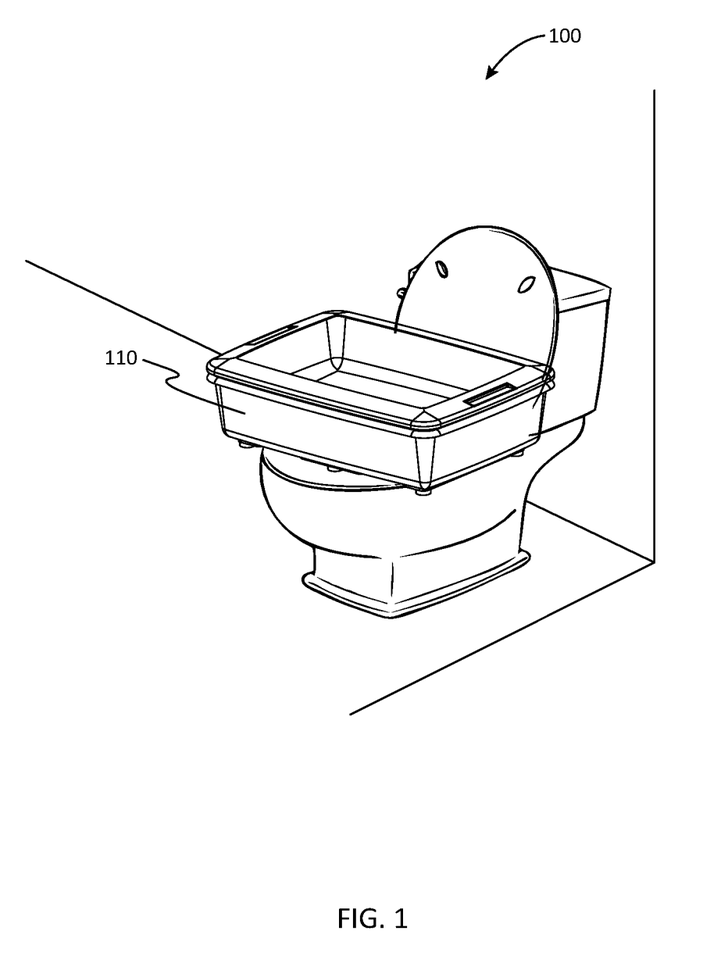
FIG. 1 is a perspective view of the cat waste management system during an 'in-use' condition, according to an embodiment of the disclosure.

Referring now more specifically to the drawings by numerals of reference, there is shown in FIGS. 1-5B, various views of a cat waste management system 100. FIG. 1 shows a cat waste management system 100 according to an embodiment of the present disclosure. As illustrated, the cat waste management system 100 may include a litter-free waste management unit 110 including a urine isolation container 112, a urine drainage receiver 120 positioned on an inside bottom portion of the urine isolation container 112 in static, gravitational positioning, a urine separation container 126, a urine collection tray 134 having a drainage port 136 and a separator ring 138 in position, surrounding the drainage port 136, a urine drainage system 146, and a filter medium tray 154 containing a filter-medium 160 which is supported by the urine drainage receiver 120. All components of the litter-free waste management unit 110 are stackable vertically including the urine isolation container 112, the urine separation container 126, the urine drainage receiver 120, the urine collection tray 134, the filter medium tray 154, and the filter medium 160. The urine drainage receiver 120 provides perimeter support of the filter medium tray 154 positioned above the urine drainage receiver 120. The litter-free waste management unit 110 utilizes gravity to direct liquid excreta through the litter-free waste management unit 110. The filter medium 160 is configured to allow liquid excreta to pass therethrough while permitting solid excreta from passing therethrough.

Figure 2:
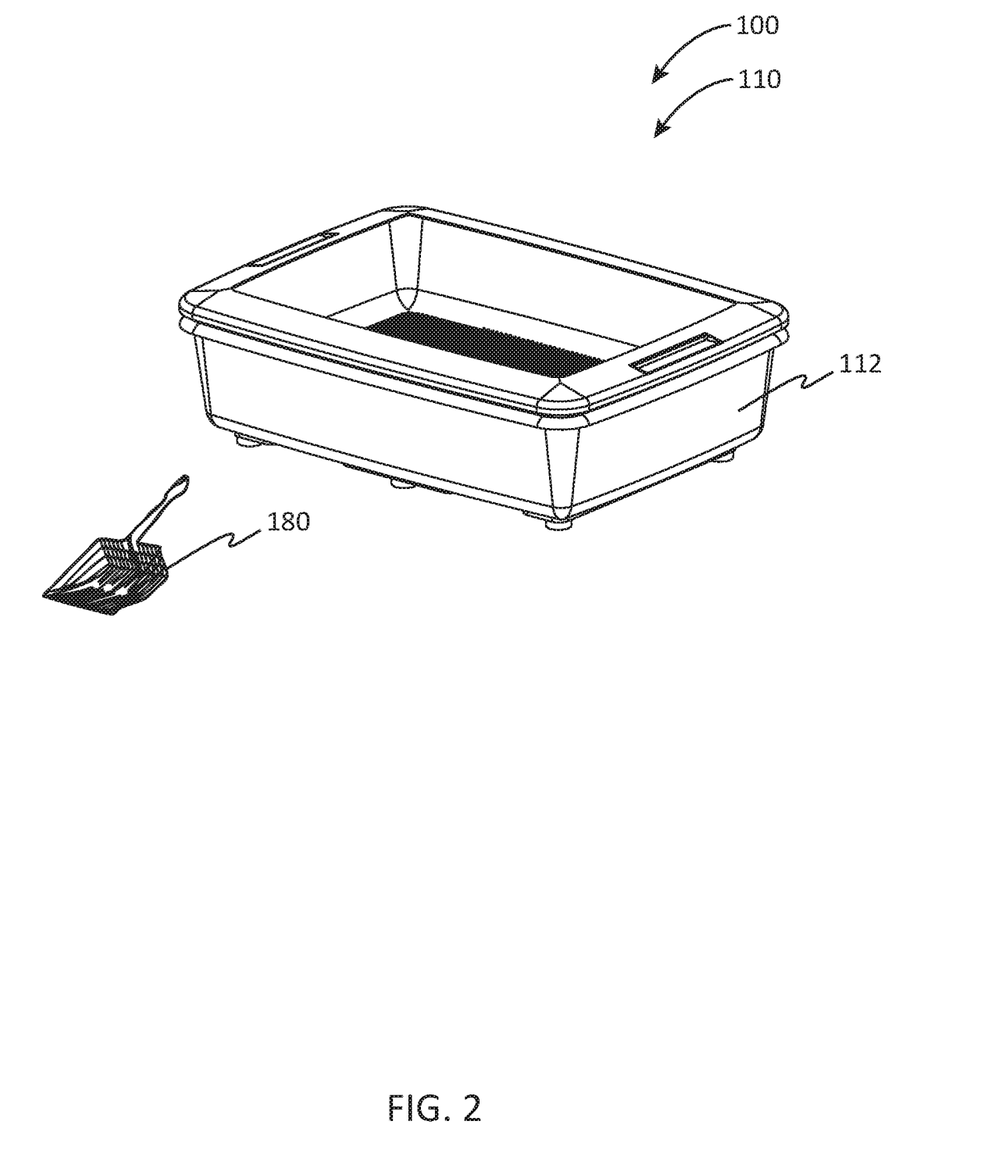
FIG. 2 is a perspective view of the cat waste management system of FIG. 1, according to an embodiment of the present disclosure.

FIG. 2 shows a perspective view of the cat waste management system 100 of FIG. 1, according to an embodiment of the present disclosure. As above, the cat waste management system 100 may include the litter-free waste management unit 160 including the urine isolation container 112, the urine drainage receiver 120, the urine separation container 126, the urine collection tray 134 having the drainage port 136, the urine drainage system 146, and the filter medium tray 154 containing the filter-medium 160 supported by the urine drainage receiver 120. The filter medium tray 154, as further shown in FIG. 4A, comprises a plurality of interconnected solid cones; the cones are configured to displace all horizontal surfacing, preventing the filter medium 160 from lying flat and relieving surface tension of liquid excreta to the filter medium 160. The urine drainage receiver 120 further comprises overflow holes. The urine isolation container 112 is transparent for viewing and monitoring urine-levels. Portions of the litter-free waste management unit 110 comprise polypropylene. The urine collection tray 134 is concave when in use and supported at an angle forming a downward slope.

Figure 3:
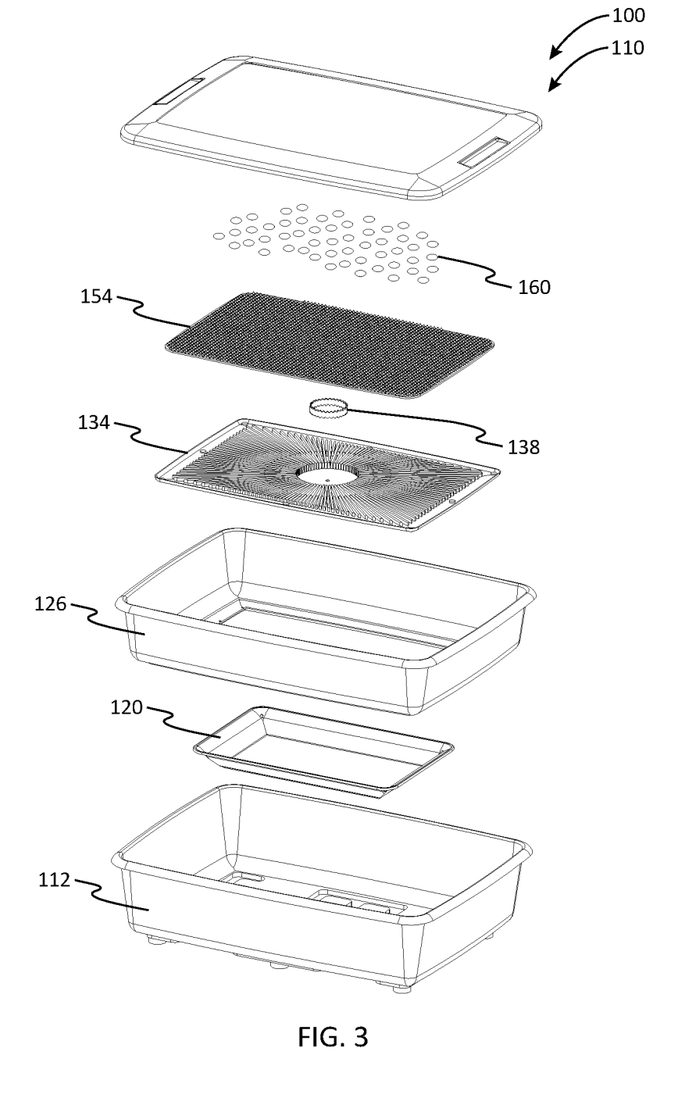
FIG. 3 is an exploded view of the cat waste management system of FIG. 1, according to an embodiment of the present disclosure.
Figure 4A:
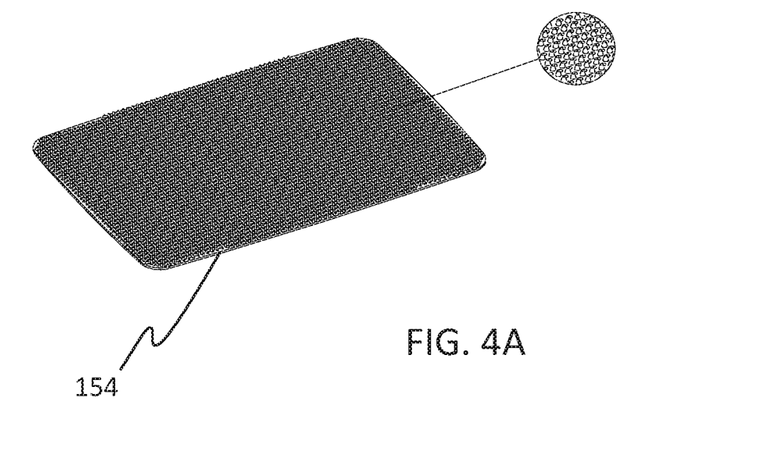
FIG. 4A is a perspective view of the cat waste management system of FIG. 1, according to an embodiment of the present disclosure.
Figure 4B:
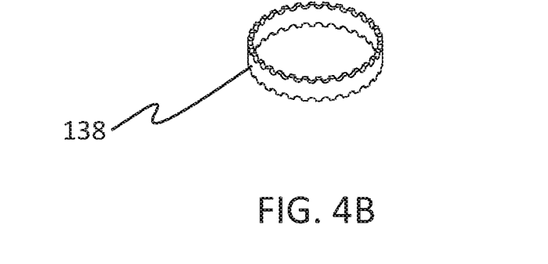
FIG. 4B is a perspective view of the cat waste management system of FIG. 1, according to an embodiment of the present disclosure.
Figure 4C:
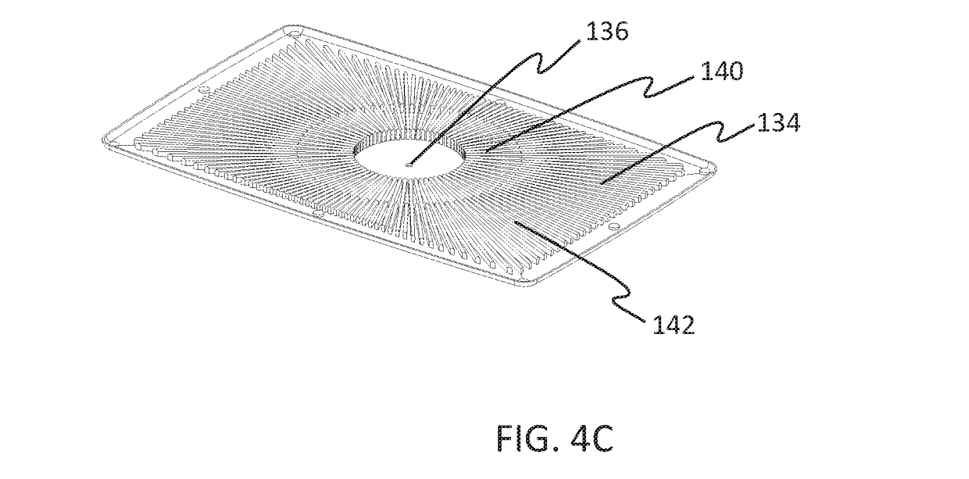
FIG. 4C is a perspective view of the cat waste management system of FIG. 1, according to an embodiment of the present disclosure.
Figure 5A:
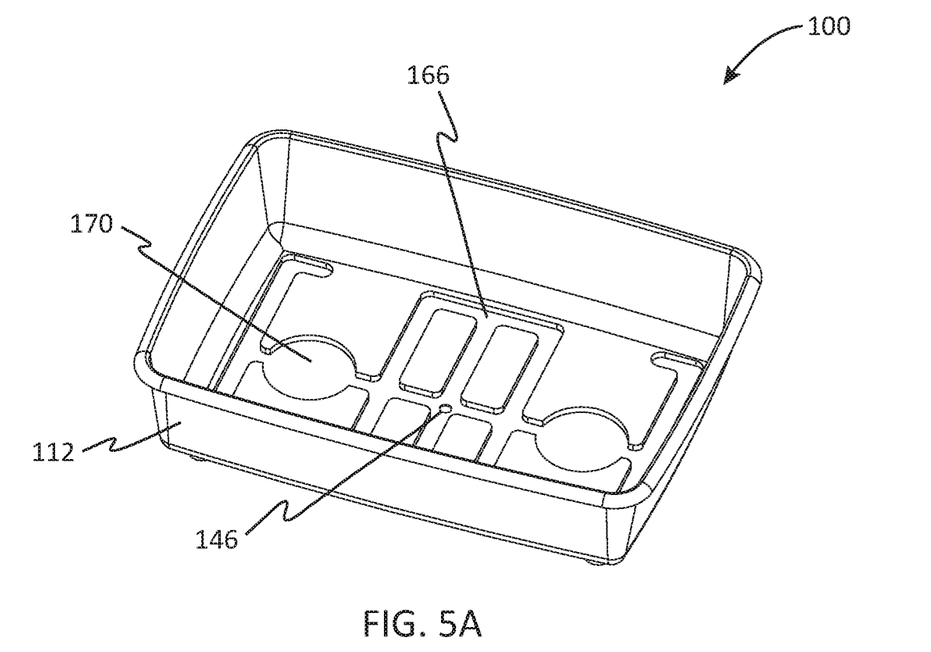
FIG. 5A is a top perspective view of the cat waste management system of FIG. 1, according to an embodiment of the present disclosure.
Figure 5B:
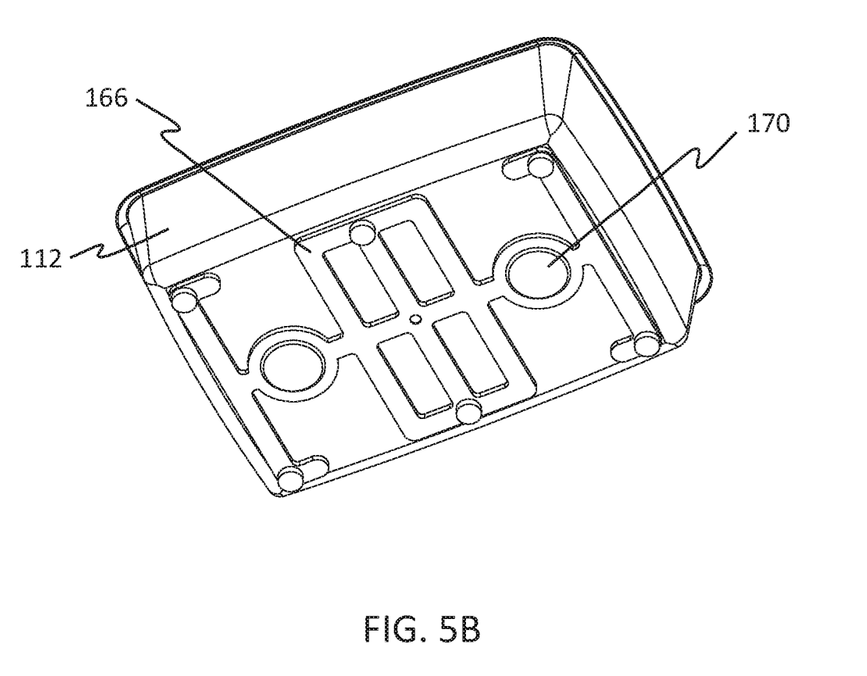
FIG. 5B is a bottom perspective view of the cat waste management system of FIG. 1, according to an embodiment of the present disclosure.

FIG. 3 shows an exploded view of the cat waste management system 100 of FIG. 1, according to an embodiment of the present disclosure. As above, the cat waste management system 100 may include the urine collection tray 134. The urine collection tray 134 includes a first set of laterally undulating radii 140 and a second set of laterally undulating radii 142, further shown in FIG. 4C. The first set of laterally undulating radii 140 begins two inches from the drainage port 136 and the second set of laterally undulating radii 142 begins four inches from the drainage port 136. In a preferred embodiment, the first set of laterally undulating radii 140 comprises 71 radii and the second set of laterally undulating radii 142 comprises 71 radii. The first set of laterally undulating radii 140 and the second set of laterally undulating radii 142 are raised 1/16"-1/8" high and no wider than 1/8". The first set of laterally undulating radii 140 and the second set of laterally undulating radii 142 are of alternate length, in order to avoid convergence of radial undulations, as they approach the drainage port 136.

The urine collection tray 134 of the litter-free waste management unit 110 is concave when in use and supported at an angle forming a downward slope. The angle is a minimum of 1.0 degrees and a maximum of 1.5 degrees. The urine collection tray 134 comprises spacers positioned about a perimeter of the urine collection tray 134. The urine separation container 126 comprises a length of approximately 23.5 inches, a width of approximately 16.875 inches and a height of approximately 4.75 inches. The urine isolation container 112 comprises a length of approximately 23.5 inches, a width of approximately 16.875 inches, and a height of approximately 5.875 inches. The urine isolation container 112 comprises a gutter system 166; the gutter system 166 is in fluid communication with urine drainage valves 170 and is configured to direct liquid excreta to the urine drainage valves 170. The gutter system 166 comprises a series of channels having a convex, semi-cylindrical shape. The separator ring 138 is further shown in FIG. 4B.

The filter medium 160 is comprised of an assortment of stones. Preferably, the filter medium 160 is an assortment of naturally occurring, asymmetrical stones, which have been smoothed by water action. The cat waste management system 100 may further include a feces scoop 180; the feces scoop 180 is configured to allow the stones to pass therethrough while retaining solid excreta.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A cat waste management system comprising:
    a litter-free waste management unit including,
        a urine isolation container having a floor, four rectangularly arranged sides, and an open top, and a urine drainage system,
        a urine separation container having four sloped sides, an open bottom, and an open top which is larger in width and length than the open bottom,
        a urine drainage receiver comprising a rectangular tray structure able to nest within the open bottom of the urine separation container, the urine drainage receiver includes overflow holes,
        a urine collection tray having a drainage port and a slope descending from a periphery to said drainage port,
        a separator ring able to circumscribe said drainage port when placed upon the urine collection tray, said separator ring having two circular edges, each of said two circular edges being interrupted by a plurality of drainage reliefs, such that each of said two circular edges have a serrated profile, said separator ring being equal in height to a rise in said slope of the urine collection tray,
        a filter medium tray containing a filter-medium and having solid cones interspersed by apertures,
    wherein said urine isolation container, said urine separation container, said urine drainage receiver, said urine collection tray, said filter medium tray and said filter medium are stackable vertically;
    wherein said urine separation container and said urine drainage receiver are simultaneously each in contact with said urine isolation container and an underside of said urine collection tray when said litter-free waste management unit is assembled;
    wherein said filter medium tray rests upon an external perimeter of said urine collection tray and said separator ring simultaneously when said litter-free waste management unit is assembled;
    wherein said litter-free waste management unit utilizes gravity to direct liquid excreta through said litter-free waste management unit; and
    wherein said filter medium is configured to allow liquid excreta to pass therethrough while prohibiting solid excreta from passing therethrough.

2. The cat waste management system of claim 1, wherein said urine isolation container is transparent for viewing and monitoring urine-levels.

3. The cat waste management system of claim 1, wherein said urine collection tray is concave when in use and supported at an angle forming a downward slope.

4. The cat waste management system of claim 1, wherein said urine isolation container is transparent for viewing and monitoring urine-levels.

5. The cat waste management system of claim 1, wherein said urine collection tray is concave when in use and supported at an angle forming a downward slope.

6. The cat waste management system of claim 3, wherein said angle is a minimum of 1.0 degrees and a maximum of 1.5 degrees.

7. The cat waste management system of claim 1, wherein said urine collection tray comprises spacers.

8. The cat waste management system of claim 1, wherein said urine separation container comprises a length of approximately 23.5 inches, a width of approximately 16.875 inches and a height of approximately 4.75 inches.

9. The cat waste management system of claim 1, wherein said urine isolation container comprises a length of approximately 23.5 inches, a width of approximately 16.875 inches, and a height of approximately 5.875 inches.

10. The cat waste management system of claim 1, wherein said urine collection tray includes a first set of laterally undulating radii and a second set of laterally undulating radii.

11. The cat waste management system of claim 8, wherein said first set of laterally undulating radii begins two inches from said drainage port and said second set of laterally undulating radii begins four inches from said drainage port.

12. The cat waste management system of claim 9, wherein said first set of laterally undulating radii has 71 or fewer separate radii and said second set of laterally undulating radii has 71 or fewer separate radii.

13. The cat waste management system of claim 10, wherein said first set of laterally undulating radii and said second set of laterally undulating radii are raised 1/16"-1/8" high and no wider than 1/8".

14. The cat waste management system of claim 11, wherein said first set of laterally undulating radii and said second set of laterally undulating radii are of alternate length, in order to avoid convergence of radial undulations, as they approach said drainage port.

15. The cat waste management system of claim 1, wherein said urine isolation container comprises a gutter system, said gutter system is in fluid communication with urine drainage valves and is configured to direct liquid excreta to said urine drainage valves.

16. The waste management system of claim 1, wherein the filter medium tray comprises at least ninety percent as many apertures as solid cones.

17. The cat waste management system of claim 1, wherein portions of said litter-free waste management unit including said urine isolation container comprise polypropylene.

18. The cat waste management system of claim 1, wherein said filter medium comprises an assortment of stones.

19. The cat waste management system of claim 18, further includes a feces scoop, said feces scoop is configured to allow said stones to pass therethrough while retaining solid excreta.

20. A cat waste management system, the cat waste management system comprising:
　a litter-free waste management unit including,
　　a urine isolation container having a floor, four rectangularly arranged sides, and an open top, and a urine drainage system,
　　a urine separation container having four sloped sides, an open bottom, and an open top which is larger in width and length than the open bottom,
　　a urine drainage receiver comprising a rectangular tray structure able to nest within the open bottom of the urine separation container, the urine drainage receiver includes overflow holes,
　　a urine collection tray having a drainage port and a slope descending from a periphery to said drainage port,
　　a separator ring able to circumscribe said drainage port when placed upon the urine collection tray, said separator ring having two circular edges, each of said two circular edges being interrupted by a plurality of drainage reliefs, such that each of said two circular edges have a serrated profile, said separator ring being equal in height to a rise in said slope of the urine collection tray,
　　a filter medium tray containing a filter-medium and having solid cones interspersed by apertures,
　wherein said urine isolation container, said urine separation container, said urine drainage receiver, said urine collection tray, said filter medium tray and said filter medium are stackable vertically;
　wherein said urine separation container and said urine drainage receiver are simultaneously each in contact with said urine isolation container and an underside of said urine collection tray when said litter-free waste management unit is assembled;
　wherein said filter medium tray rests upon an external perimeter of said urine collection tray and said separator ring simultaneously when said litter-free waste management unit is assembled;
　wherein said litter-free waste management unit utilizes gravity to direct liquid excreta through said litter-free waste management unit; and
　wherein said filter medium is configured to allow liquid excreta to pass therethrough while prohibiting solid excreta to pass therethrough;
　wherein said urine isolation container is transparent for viewing and monitoring urine-levels;
　wherein said urine collection tray is concave when in use and supported at an angle forming a downward slope;
　wherein said urine collection tray is concave when in use and supported at an angle forming a downward slope;
　wherein said angle is a minimum of 1.0 degrees and a maximum of 1.5 degrees;
　wherein said urine collection tray comprises spacers;
　wherein said urine separation container comprises a length of approximately 23.5 inches, a width of approximately 16.875 inches and a height of approximately 4.75 inches;
　wherein said urine isolation container comprises a length of approximately 23.5 inches, a width of approximately 16.875 inches, and a height of approximately 5.875 inches;
　wherein said urine collection tray includes a first set of 71 laterally undulating radii and a second set of 71 laterally undulating radii;
　wherein said first set of laterally undulating radii begins two inches from said drainage port and said second set of laterally undulating radii begins four inches from said drainage port;
　wherein said first set of laterally undulating radii and said second set of laterally undulating radii are raised 1/16"-1/8" high and no wider than 1/8";
　wherein said first set of laterally undulating radii and said second set of laterally undulating radii are of alternate length, in order to avoid convergence of radial undulations, as they approach said drainage port;
　wherein said urine isolation container comprises a gutter system, said gutter system is in fluid communication with urine drainage valves and is configured to direct liquid excreta to said urine drainage valves;
　wherein portions of said litter-free waste management unit including said urine isolation container comprise polypropylene; and
　wherein said filter medium comprises an assortment of stones.

* * * * *